Patented Nov. 27, 1951

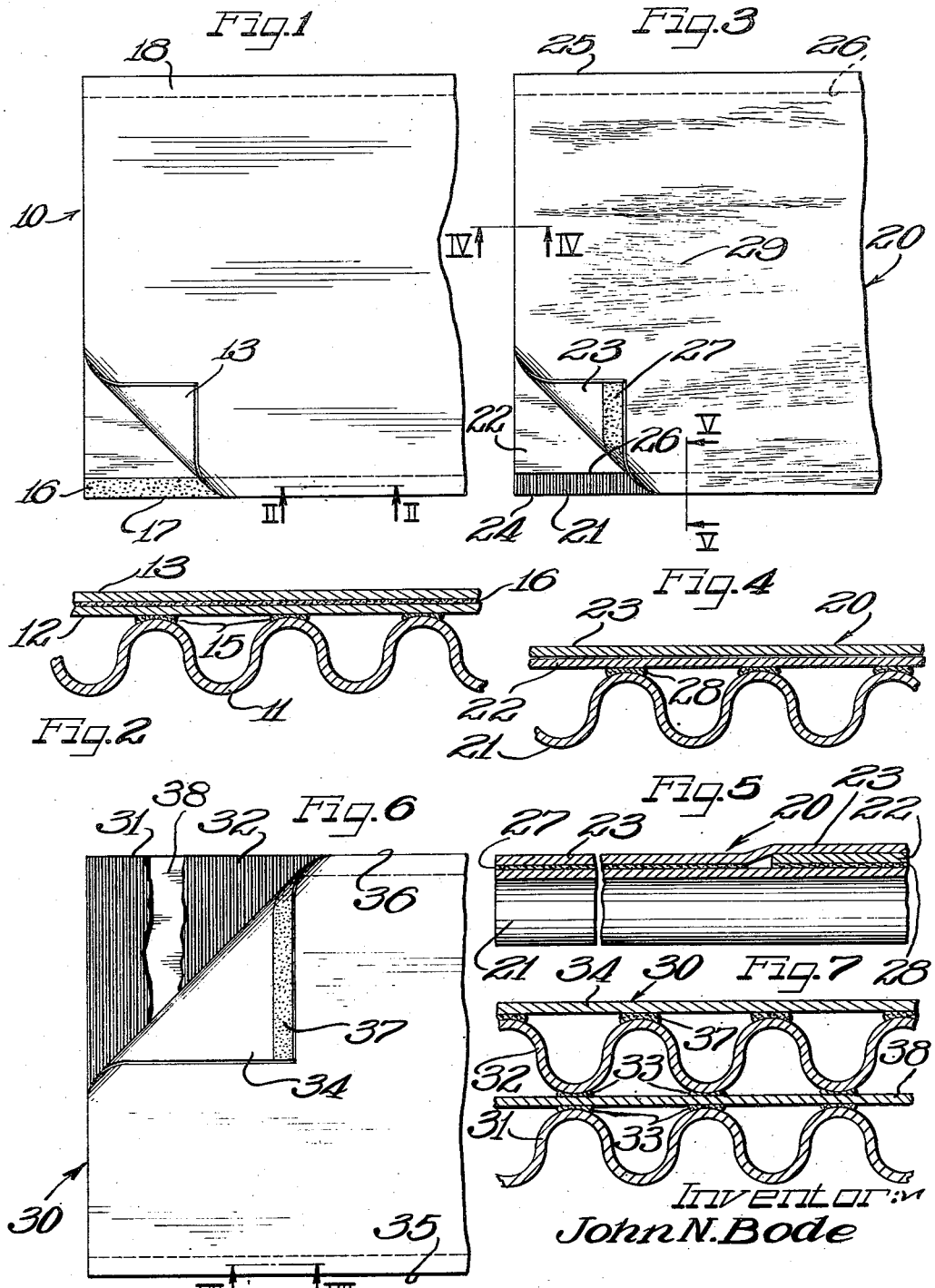

2,576,278

UNITED STATES PATENT OFFICE 2,576,278

LAMINATED PAPER PRODUCT

John N. Bode, Birmingham, Mich.

Application May 10, 1951, Serial No. 225,603

4 Claims. (Cl. 154—55)

The present invention relates to a flexible laminated paper product, and more particularly, to a wrapper for the wrapping of articles having irregular contours and projecting surfaces. This application is a continuation-in-part of my application Serial No. 112,091, filed August 24, 1949, now abandoned.

The conventional corrugated papers, such as corrugated chip-board and the like, are not entirely suitable for wrapping articles of the character mentioned, especially where such articles are likely to be roughly handled, because corrugated papers and boards are usually composed largely of mechanical wood fibers and, therefore, do not possess the required tensile strength. Furthermore, if relatively heavy weight corrugated papers or boards are used, they are difficult to manipulate in wrapping relatively large and irregular objects.

An object of the present invention is to provide a flexible laminated paper product which, to a large degree, overcomes the drawbacks present in the conventional laminated wrapping papers. This object is largely accomplished by employing a base sheet, which may be composite in character, of cushioning material, and specifically, corrugated paper, an intermediate sheet of paper secured to the corrugated board, and an outer sheet of strong paper secured only along spaced areas to the intermediate sheet or to the base sheet. The resulting laminated product has greater flexibility than if all of the laminae were secured together throughout their coextensive areas, and also has greater resistance to scuffing, apparently due to the ability of the "floating" outer sheet to "give," or slip, when a scuffing force is applied to its surface.

It is, therefore, an object of the present invention to provide a composite laminated paper product having a cushion layer and a scuff-resistant outer layer secured thereto along relatively widely spaced areas.

A further object of the present invention is to provide a flexible composite laminated paper product having a corrugated cushion layer and an outer scuff-resistant layer secured directly or indirectly to the corrugated layer along comparatively widely separated, narrow strips.

Other and further important objects of this invention will become apparent from the following description and appended claims.

On the drawing:

Figure 1 is a broken plan view of a laminated paper wrapper embodying the principles of my invention.

Figure 2 is an enlarged sectional view taken substantially along the line II—II of Figure 1.

Figure 3 is a fragmentary, top plan view of a modified form of my invention.

Figure 4 is an enlarged sectional view taken substantially along the line IV—IV of Figure 3.

Figure 5 is an enlarged sectional view taken substantially along the line V—V of Figure 3.

Figure 6 is a fragmentary plan view of a further modified form of my invention.

Figure 7 is an enlarged sectional view taken substantially along the line VII—VII of Figure 6.

The reference numeral 10 denotes a laminated paper product of my invention that is particularly useful for the wrapping of articles having irregular contours, as, for instance, bumpers and other parts of automotive vehicles. As shown in Figures 1 and 2, the laminated paper product 10 comprises a cushion base of corrugated paper or board, indicated by the reference numeral 11, an intermediate paper sheet 12 and an upper, or outer paper sheet 13. The intermediate sheet 12 is joined to the crests of ridges of the corrugated sheet 11 by means of adhesive, indicated at 15, the sheets 12 and 11 being substantially coextensive and being adhesively joined together throughout the contact areas between the ridges of the corrugated sheet and the opposed surface of the intermediate sheet 12. The outer sheet 13, however, is joined to the intermediate sheet 12 only along relatively widely spaced areas, which are preferably narrow marginal strips of adhesive material 16 extending along opposite edges 17 and 18 of the laminated paper wrapper.

Merely by way of illustration, the laminated paper wrapper 10 may be from three to five feet in width between the edges 17 and 18, and the strips of adhesive material 16 may be an inch or two in width and extend continuously along the opposite edges 17 and 18 for the full length of the paper. The paper itself is of indefinite length and usually comes in rolls containing a great many feet of the laminated paper wrapper. The desired length of the wrapper is cut off from the roll for each individual use.

In Figures 3, 4 and 5, a modification of my invention is illustrated, in which a laminated paper wrapper 20 is composed of a base 21 of corrugated paper, an intermediate sheet of paper 22 and an outer sheet of paper 23. In this embodiment, the intermediate sheet 22 terminates inwardly of the outer edges 24 and 25 of the corrugated cushion base 21, as at 26. The underside of the outer sheet 23 is provided with a narrow strip of adhesive material 27 continuously along the edges corresponding with the edges 24 and 25, and these adhesive strips serve to join the outer sheet 23 directly to the ridges of the corrugated base 21. The intermediate sheet 22 is joined to the corrugated base 21 by strips of adhesive material 28 extending along the crests of the corrugated base 21 and uniting said crests to the undersurface of the intermediate sheet 22 throughout its entire width.

The general construction and arrangement of the laminae making up the wrapper 20 are closely similar to those in the case of the wrapper 10, both providing an outer, or scuff, sheet that is joined by narrow adhesive strips along the opposed edges only of the composite sheet so as to permit separation of the main intermediate portion of the outer sheet 23 from the intermediate sheet 22. It is this freedom to separate that is largely responsible for the resistance of the outer sheet to scuffing. At the same time, the outer sheet is securely united along its opposed outer margins to either the intermediate sheet or to the corrugated base sheet, so that the wrapper as a whole can be easily handled and manipulated for wrapping purposes. In the case of the wrapper 20, the outer sheet 23 may suitably be of a semi-crepe paper, which, although substantially planar, has minute rugosities 29 that give the sheet added flexibility and a limited amount of stretchability.

In the further embodiment of my invention illustrated in Figures 6 and 7, the cushion base of the laminated paper wrapper 30 comprises a corrugated sheet 31, an intermediate planar sheet 38, and a second corrugated sheet 32, the corrugated sheets 31 and 32 being joined to the intermediate flat sheet 38 along their crests by adhesive material 33. An outer, or scuff, sheet 34, is joined only along the opposite edges 35 and 36 to the corrugated sheet 32 by relatively narrow strips of adhesive material 37. Since the corrugated sheets 31 and 32 are joined only through their crests or ridges to the intermediate sheet 38, the composite cushion base is comparatively flexible, and at the same time, gives unusual cushioning characteristics to the composite wrapper. The outer sheet 34, like the other outer sheets 13 and 23, is non-united to the intermediate sheet for the greater part of its width to provide the floating properties that are desired.

In each of the embodiments of my invention, the corrugations or ridges of the corrugated base sheet run transversely of the length of the laminated paper wrapper, that is, from one edge to the other the full width of the paper. This makes for easy winding of the paper wrapper into rolls and also gives added flexibility when the wrapper is used to wrap elongated articles, the length of which also is in the direction of the corrugations.

As illustrative of the types of paper that may be used for the outer and intermediate sheets, these may consist of kraft paper, or any other suitable paper of good strength and medium weight, preferably having a basis weight of from 30 to 90 pounds per ream of 480 sheets, 24" by 36". The outer, or scuff, sheet is preferably relatively waterproof, and for this purpose, may be sized or impregnated with a rosin or resin composition, such as a melamine resin composition. For added flexibility, the outer sheet may be creped, as in the case of the outer sheet 23. The corrugated sheet, or sheets, consituting the cushion base, may have a basis weight of between 30 and 75 pounds per ream. As a specific example, the corrugated base sheet may be 54 pounds, the intermediate sheet 30 to 35 pounds, and the outer, or fly-sheet, 50 pounds. The adhesive used in adhering the outer sheet to the intermediate sheet, or the outer sheet to the corrugated base, or the corrugated base to the intermediate corrugated sheet, should be a vegetable type of adhesive, such as a vegetable glue, dextrin, or the like. The use of silicate of soda of other inorganic adhesives is not to be preferred. The outer, or scuff, sheet is attached either directly or indirectly to the cushion backing sheet, preferably, by only two strips of adhesive running along the opposite lengthwise edges of the wrapper web. The adhesive should be of such strength that no separation will occur during transit or during use of the product for wrapping purposes. The outer sheet must be so adhered to the backing that there is room for the formation of air pockets when the sheet is wrapped around articles of irregular contour or configuration.

In the use of any of the various embodiments of my invention, the outer, or fly-sheet, being free to shift slightly under impact and particularly glancing blows, turns the force of the shock and protects the product wrapped in my composite wrapper.

It will be understood that modifications and variations may be effected without departing from the scope of the novel concepts of the present invention.

I claim as my invention:

1. A flexible laminated wrapper comprising a relatively thick flexible cushion base layer of corrugated paper having valleys and ridges, an intermediate layer of flexible paper substantially coextensive with said cushion base and joined to said cushion base along the ridges thereof, a separate one-piece outer layer of flexible, tough paper overlying said intermediate layer and adhesive material uniting said outer layer in permanent assembly with said intermediate layer said cushion base along only two opposite widely separated rectilinear edges thereof, said adhesive material being confined within narrow marginal portions contiguous to said edges to leave a major width portion of said outer layer between said marginal portions entirely unattached to said intermediate layer, and the ridges of the corrugations of said base extending between said edges at right angles thereto to facilitate the winding of said wrapper into a roll with the corrugations parallel to the axis of said roll.

2. A flexible laminated paper wrapper of initially considerable length to afford a supply for individual wrappers to be severed therefrom for use in the wrapping of articles of irregular configurations, said wrapper consisting essentially of a relatively thick flexible cushion base of corrugated paper having valleys and ridges, an intermediate layer of flexible paper substantially coextensive with said cushion base and joined to said cushion base along the ridges thereof, a separate one-piece outer layer of flexible, tough paper overlying said cushion base and adhesive material uniting said outer layer to said cushion base along each of two oppositely widely separated rectilinear edges thereof, said adhesive material being confined within narrow marginal portions contiguous to said edges to leave a major width portion of said outer layer between said marginal portions entirely unattached to said cushion base, and the ridges of the corrugations of said base extending between said edges at right angles thereto to facilitate the winding of said wrapper into a roll with the corrugations parallel to the axis of said roll.

3. As a wrapper for the wrapping of articles of irregular configurations, a flexible laminated paper wrapper consisting of at least three elongated plies; first, a relatively thick, flexible cushion base of corrugated paper having valleys and ridges; second, an imperforate planar sheet of flexible paper substantially coextensive with said corrugated paper base and adhesively secured to the ridges of said corrugated paper base throughout the full length thereof; and, third, a separate one-piece imperforate sheet of flexible paper overlying said second ply sheet to constitute the outer protective ply of said wrapper and substantially coextensive in area with said first and second plies; said second and third plies being joined together only at their elongated longitudinal edges by relatively narrow widely separated strips of adhesive material extending transversely of the ridges of the corrugations of said base, said strips of adhesive material being spaced sufficiently far apart to impart to said outer protective ply the ability to give when a scuffing force is applied thereto, the resulting laminated paper having greater flexibility than if said sheets were adhesively secured together throughout their coextensive surfaces.

4. As a wrapper for the wrapping of large articles of irregular configuration, a flexible laminated paper wrapper comprising a relatively thick composite cushion base layer consisting of two corrugated paper sheets having valleys and ridges and an intermediate layer of flexible paper substantially coextensive with said corrugated sheets and joined to the ridges of said two corrugated sheets, an outer one-piece layer of tough paper overlying said cushion base layer and adhesive material uniting said outer layer to said cushion base layer along each of two widely separated rectilinear edges thereof only, said adhesive material being confined entirely within narrow marginal portions contiguous to said edges to leave a major width portion of said outer layer between said marginal portions entirely unattached to said composite cushion base layer, the ridges of said corrugations of said base layer all extending between said edges at right angles thereto to facilitate the winding of said wrapper into a roll with the corrugations parallel to the axis of said roll.

JOHN N. BODE.

REFERENCES CITED

The following references are of record in the file of this patent:

UNITED STATES PATENTS

| Number | Name | Date |
|---|---|---|
| 669,349 | Read | Mar. 5, 1901 |
| 1,184,749 | Hicks | May 30, 1916 |
| 1,555,182 | Bulis | Sept. 29, 1925 |
| 2,553,923 | Lambert | May 22, 1951 |

FOREIGN PATENTS

| Number | Country | Date |
|---|---|---|
| 111,808 | Great Britain | Dec. 13, 1917 |
| 311,831 | Great Britain | May 23, 1929 |